March 29, 1960   A. E. EVANSON ET AL   2,930,068
VACUUM DEVICE FOR PICKING UP GRASS, LEAVES, AND THE LIKE
Filed Oct. 25, 1957   2 Sheets-Sheet 1
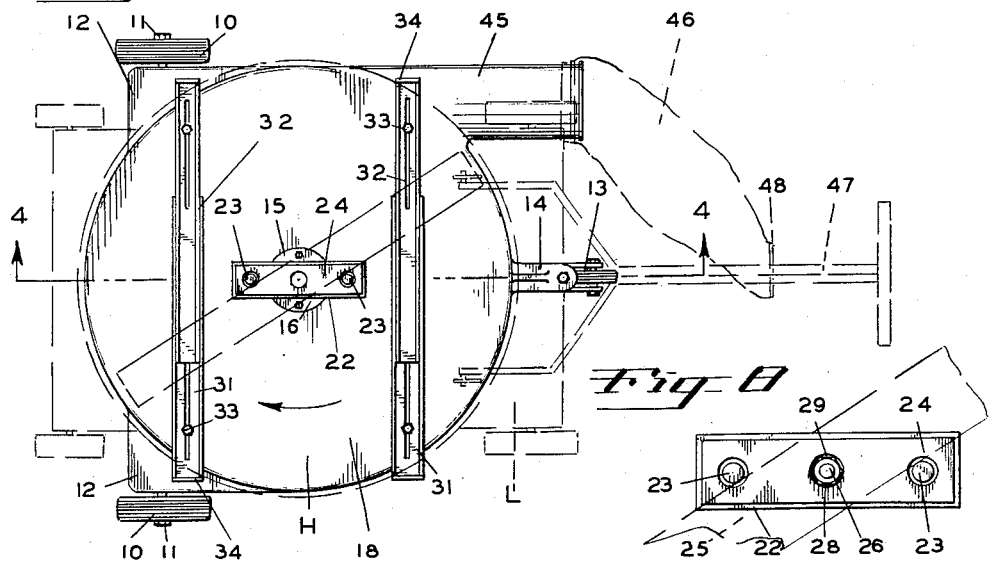
INVENTOR.
AUSTIN E. EVANSON
MILTON A. HICKEY
BY
Kimmel & Crowell
ATTORNEYS March 29, 1960  A. E. EVANSON ET AL  2,930,068
VACUUM DEVICE FOR PICKING UP GRASS, LEAVES, AND THE LIKE
Filed Oct. 25, 1957  2 Sheets-Sheet 2
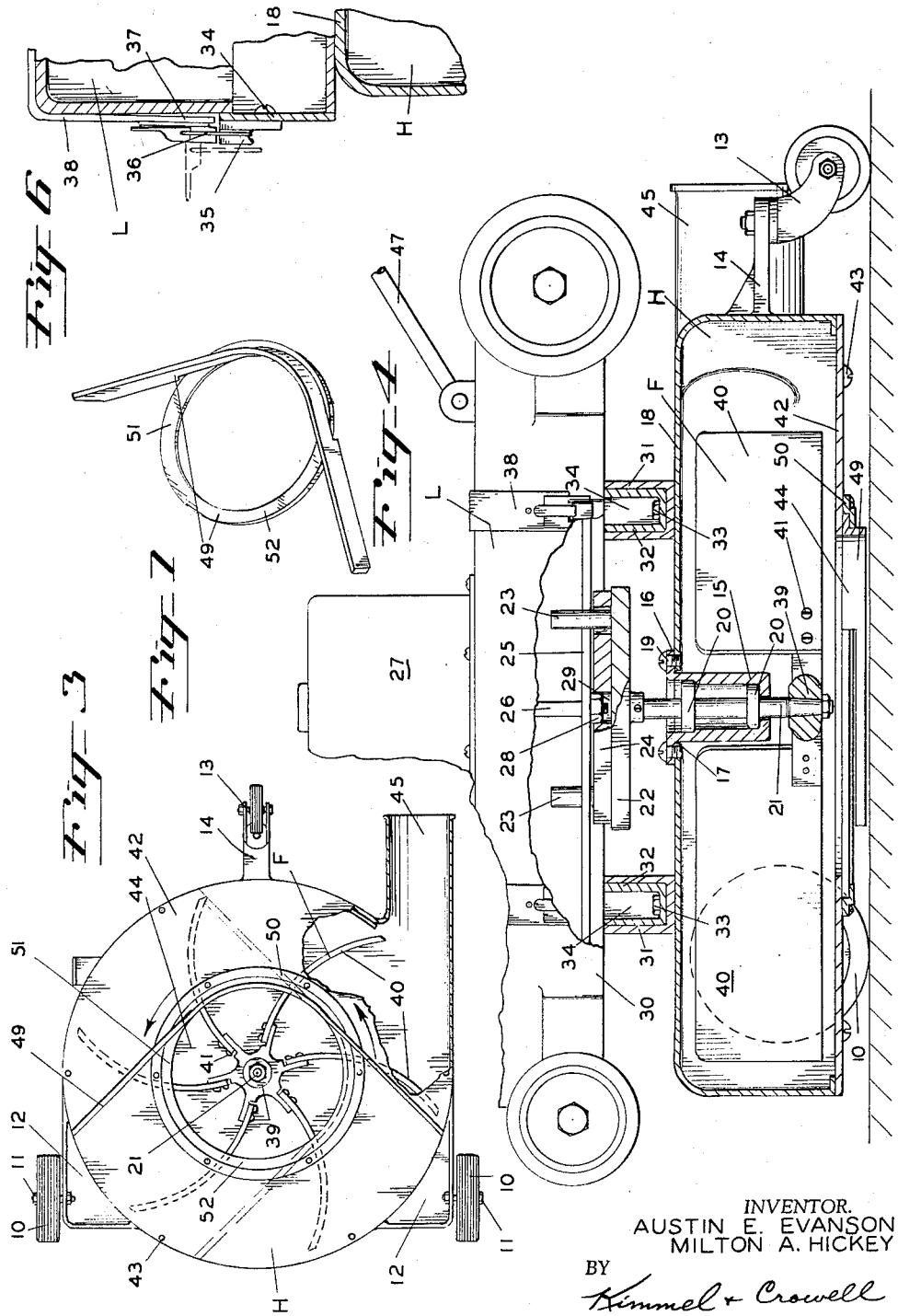
INVENTOR.
AUSTIN E. EVANSON
MILTON A. HICKEY
BY
Kimmel + Crowell
ATTORNEYS

United States Patent Office 2,930,068
Patented Mar. 29, 1960

2,930,068

VACUUM DEVICE FOR PICKING UP GRASS, LEAVES, AND THE LIKE

Austin E. Evanson and Milton A. Hickey, Corvallis, Oreg.

Application October 25, 1957, Serial No. 692,418

4 Claims. (Cl. 15—351)

The present invention relates to a vacuum device for picking up grass, leaves, snow, sawdust, rubbish and other debris.

The primary object of the invention is to provide a vacuum device employing a high velocity air stream for picking up grass, leaves, snow, rubbish and other debris off the ground surface and delivering the same into a container.

A further object of this invention is to provide a vacuum device of the above character that is supported upon ground engaging wheels and arranged to have a rotary lawn mower mounted thereon to serve as a power means driving the air moving unit of this new and improved pick up device.

Other objects and advantages will become apparent in the following specification when considered in the light of the attached drawings, in which:

Figure 1 is a plan view of the invention with the rotary lawn mower indicated by broken lines.

Figure 2 is a side elevation of the invention, illustrating the lawn mower supported upon the vacuum pick up device.

Figure 3 is a bottom plan view shown partially broken away for convenience of illustration.

Figure 4 is a vertical sectional view taken on the line 4—4 of Figure 1, looking in the direction of the arrows, and illustrating the rotary lawn mower in full lines partially broken away.

Figure 5 is a fragmentary enlarged side elevational view of the supporting structure for supporting the rotary lawn mower upon the top of the pick up device.

Figure 6 is a fragmentary sectional view, taken on the line 6—6 of Figure 5, looking in the direction of the arrows.

Figure 7 is an inverted perspective view of a constructional detail.

Figure 8 is a fragmentary plan view.

Figure 9 is a fragmentary side elevation of a modified connecting structure.

Referring now to the drawings in detail wherein like reference numerals indicate like parts throughout the several figures, the reference character H indicates generally a combined housing and frame of a vacuum pick up device for grass, leaves, and the like. The housing H, in addition to providing a frame for the device, also provides a housing for a fan F. The housing H is mounted on wheels 10 journalled to stub shafts 11 fixedly secured to the housing H by integral extended frame members 12, as best illustrated in Figures 1 and 3.

A caster wheel assembly 13 is rotatably mounted to a rearwardly extended bracket 14, forming part of the housing H, best illustrated in Figures 1, 3 and 4.

Extended downwardly centrally of the housing H is a removable bearing cup 15. The bearing cup 15 has an outwardly extending flange 16 formed on its upper end. The bearing cup 15 extends down through an opening 17 in top 18 of the housing H, and the flange 16 is secured to the top 18 thereof by suitable bolts 19. Mounted within the bearing cup 15 are bearings 20 and rotatably mounted within the bearings 20 is a vertical shaft 21.

Fixedly secured to the upper end of the shaft 21 is a transverse bar 22, having upwardly extending pins 23 forming part thereof. Loosely mounted on the top of the bar 22, pierced by the pins 23, is an adapter plate 24, referring particularly to Figures 4 and 8.

Referring particularly to Figure 4, a rotary cutter bar 25, forming part of the rotary lawn mower L, is fixedly secured to a shaft 26 driven by a motor 27. The cutter bar 25 is retained by a lock nut 28 which varies in size with different makes of lawn mowers L. The adapter bar 24 has a hole 29 formed therein to receive the nut 28 of the rotor 25 snugly so that there will be no side play therebetween. This centers the lawn mower L when set down over the housing H, in the following manner.

A housing 30 of the lawn mower L rests upon channels 31 and 32, which telescope one within the other for adjustment and are detachably secured to the top 18 of the pick up device by cap screws 33. Upwardly turned ends 34 are formed on the channels 31, 32, referring to Figures 5 and 6. Hooks 35 are fixedly secured thereto to receive self-tightening toggle latches 36 of conventional structure. The latches 36 are fixedly secured to the ends 37 of strap 38.

The effective length of the channels 31, 32 are adjusted to fit the housing 30 of the lawn mower L so that the turned up ends 34 are in a position to contact the outer rim of the housing 30 after the nut 28 has positioned the lawn mower drive shaft 26 directly in line with the shaft 21 of the pick up device.

The cap screws 33 then can be tightened down, clamping the channels 31, 32 in this adjusted position. After the adjustment has been made, it will remain fixed for use of the device with this particular mower L. Straps 38 are then attached to the latches 36 so that when they are snapped over the hooks 35, the straps 38 will bear down tightly against the lawn mower housing 30, holding the same in close contact with the supporting bars 31.

Fixedly secured to the lower end of the shaft 21 of the pick up device is a hub 39 of the fan F. The hub 39 is formed in the shape of a spider, as best illustrated in Figure 3, having the blades 40 secured thereto by rivets 41.

The bottom of the housing H is partially closed by a closure plate 42 held to the housing H by screws 43. Located centrally of plate 42 is an opening 44 to permit the intake of air carrying grass and other materials to be removed from the surface of the ground.

The housing H has a discharge nozzle 45 to which a pick up bag 46 is secured by suitable means at its lower end. The upper end of the bag 46 is supported by handle 47 of the lawn mower by a transverse clip 48. Rotatably mounted under the bottom plate 42 is a V-shaped deflector 49 carried by a flange 51 and secured to the plate 42 by a ring 50.

The V-shaped deflector is open at the bottom and in the front, and comes in close proximity to the ground surface. When moving the device forward, the deflector 49 is in the position shown in full lines in Figure 3, but in operating the pick up device along a wall, it would be positioned by rotating the same to the broken line position shown in Figure 3.

We will now describe the mode of operation of this new and improved pick up device. The proper adapter bar 24 is selected for the lawn mower L to be used, depending upon the size of the nut 28 so there will be no side play between the nut 28 and shaft 26 of the lawn mower L. The mower L is then set down over the pick up device so that the nut 28 enters the hole 29 of the bar 24. This will center the lawn mower L on the device. At the same time the cutter bar 25 of the lawn mower L will set down above the top of the adapter bar 24 and between the upwardly extending pins 23, as best illustrated in Figures 1, 4 and 8.

The supporting channels 31, 32 are then adjusted for length so that the ends 34 will extend beyond the housing 30 of the lawn mower L. This is accomplished by loosening the cap screws 33 and extending the channels 31, 32 one within the other. As the lawn mower L now is set up, the channels 31, 32 are then telescoped by the operator towards one another until the ends 34 engage the outer edge of the lawn mower housing 30. The mower L is then removed from the device and the cap screws 33 are tightened down thus permanently securing channels 31, 32 so that the channel ends 34 will always engage the outer edge of the lawn mower housing 30. The mower L is then placed back on the device in the manner aforementioned, and the hold down straps 38 are adjusted to the latches 36 so that when the latches 36 are hooked over the hooks 35 and cinched down they will hold the lawn mower L tightly in place.

The bag 46 is then hooked to the underside of the handle 47 of the lawn mower L and the operator grasps the handle 47 to move the machine in any direction he wishes through the supporting wheels 10 and 13 of the pick up device. The wheel 13 permits the easy turning of the device over the ground surface. This new and improved pick up device is now ready to be operated.

The motor 27 is started driving the lawn mower rotor shaft 26, including the cutter bar 25. The cutter bar 25 will revolve the shaft 21 of the pick up device through pins 23 and bar 22 fixedly secured to the shaft 21. This in turn will rotate the fan F at a high rate of speed, causing the high velocity suction through the opening 44, picking up the grass, leaves, and other material directed to this opening by the adjustable deflector 49.

The deflector 49 is not always used and when not used the velocity of suction will exist completely around the lower edge of the housing of the pick up device, the clearance between this lower surface being at a minimum above the ground surface, providing a high velocity suction of grass, leaves, and other material from all directions.

An alternative driving system is indicated in Figure 9, wherein the auxiliary bar 24 is eliminated and a nut 28a will be furnished to replace the nut 28 of the lawn mower so that this nut will always fit the countersunk hole 53 of the driven head 22a of the pick up device.

Having thus described the preferred embodiments of the invention, it should be understood that numerous other structural modifications and adaptations may be resorted to without departing from the scope of the appended claims.

What is claimed is:
1. A suction attachment unit for use with a rotary lawn mower comprising a housing having opposed top and bottom walls and a connecting side wall, wheels supporting said housing, a fan shaft journaled in said top wall of said housing and having one end extending thereabove, a bar medially secured to and extending horizontally from said one end of said shaft completely above said housing, means on said bar for engaging the blade on said mower in driving relation, a fan disposed within said housing, said fan being secured to the other end of said shaft for rotation therewith, adjustable supporting channel members secured to said top wall of said housing, toggle latches secured to the respective ends of each of said channel members, straps secured to said toggle latches for engagement about said rotary mower whereby said suction unit may be secured to said rotary mower, said housing having a central intake opening in said bottom wall thereof, a hollow discharge nozzle formed integrally with said side wall and communicating with the interior of said housing, and means connected to said nozzle for receiving and storing material picked up by said unit.

2. A device as set forth in claim 1 wherein said means on said bar for engaging the blade of said mower comprise a pin secured to and extending laterally upward from said bar adjacent each end thereof.

3. A device as set forth in claim 2 wherein an adapter plate is mounted on said bar, said plate having an aperture adjacent each end thereof through which a respective one of said pins on said bar pass, said plate having an aperture medially thereof for reception of the locking nut of the cutting blade assembly of said mower.

4. A device as set forth in claim 1 wherein a V-shaped deflector is secured to said bottom wall of said housing in contiguous relation to said intake opening.

References Cited in the file of this patent
UNITED STATES PATENTS

| | | |
|---|---|---|
| 928,456 | Johnson | July 20, 1909 |
| 1,297,384 | Meyers | Mar. 18, 1919 |
| 1,684,698 | Freeman | Sept. 18, 1928 |
| 1,803,160 | Adams | Apr. 28, 1931 |
| 1,954,066 | Buck | Apr. 10, 1934 |
| 2,610,351 | Lilly | Sept. 16, 1952 |

FOREIGN PATENTS

| | | |
|---|---|---|
| 19,012 | Great Britain | Aug. 21, 1913 |
| 19,776 | Holland | Aug. 15, 1929 |